(12) United States Patent
Tong et al.

(10) Patent No.: US 9,350,431 B2
(45) Date of Patent: May 24, 2016

(54) WIRELESS COMMUNICATION METHOD FOR A MU-MIMO SYSTEM, WIRELESS COMMUNICATION TERMINAL FOR COMMUNICATING WITH A BASE STATION IN A MU-MIMO SYSTEM, AND BASE STATION FOR COMMUNICATING WITH WIRELESS COMMUNICATION TERMINALS IN A MU-MIMO SYSTEM

(75) Inventors: Hui Tong, Beijing (CN); Ming Xu, Beijing (CN); Masayuki Hoshino, Kanagawa (JP); Seigo Nakao, Kanagawa (JP); Daichi Imamura, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 459 days.

(21) Appl. No.: 13/821,799

(22) PCT Filed: Nov. 4, 2010

(86) PCT No.: PCT/CN2010/078425
§ 371 (c)(1),
(2), (4) Date: Mar. 8, 2013

(87) PCT Pub. No.: WO2012/031422
PCT Pub. Date: Mar. 15, 2012

(65) Prior Publication Data
US 2013/0176948 A1    Jul. 11, 2013

(30) Foreign Application Priority Data
Sep. 10, 2010 (CN) .......................... 2010 1 0278229

(51) Int. Cl.
H04L 12/28 (2006.01)
H04B 7/04 (2006.01)
(Continued)

(52) U.S. Cl.
CPC ............ *H04B 7/0456* (2013.01); *H04B 7/0452* (2013.01); *H04L 1/0026* (2013.01); *H04L 1/0027* (2013.01); *H04L 1/0029* (2013.01); *H04L 1/06* (2013.01)

(58) Field of Classification Search
USPC .................................. 370/252, 278, 329, 430
See application file for complete search history.

(56) References Cited

U.S. PATENT DOCUMENTS

| 2011/0319027 A1* | 12/2011 | Sayana | ................ H04B 7/0632 455/67.11 |
| 2012/0113831 A1* | 5/2012 | Pelletier | ................ H04L 5/0058 370/252 |
| 2012/0320774 A1 | 12/2012 | Dai et al. | |

FOREIGN PATENT DOCUMENTS

| CN | 101771505 A | 7/2010 |
| CN | 101789849 A | 7/2010 |
| WO | 2011/085679 A1 | 7/2011 |

OTHER PUBLICATIONS

3GPP TSG RAN WG1 #62 Meeting, R1-104398, Further analysis if companion feedback performance and feedback signalling overhead reduction, Alcatel-Lucent, Alcatel-Lucent Shanghai Bell, Aug. 23, 2010, Madrid Spain.

(Continued)

*Primary Examiner* — John Pezzlo
(74) *Attorney, Agent, or Firm* — Pearne & Gordon LLP

(57) ABSTRACT

A wireless communication method, a terminal and a base station are provided. The method includes the step of transmitting a plurality of best companion pre-coding matrix indexes (BCIs) and corresponding delta channel quality indicators (ΔCQIs) from the terminal to the base station, wherein the period of frames for transmitting the plurality of BCIs is larger than the period of frames for transmitting a single BCI. The method, terminal and base station according to the present disclosure can greatly increase scheduling flexibility at base station side and improve MU-MIMO performance without increasing feedback overhead of channels.

33 Claims, 10 Drawing Sheets

(51) Int. Cl.
  *H04L 1/00* (2006.01)
  *H04L 1/06* (2006.01)
  *H04J 1/16* (2006.01)

(56) References Cited

OTHER PUBLICATIONS

3 GPP TSG RAN WG #61 Meeting, R1-102793, Further analysis of companion feedback performance and feedback signalling overhead reduction, Alcatel-Lucent, Alcatel-Lucent Shanghai Bell, May 14, 2010, Montreal, Canada.

3GPP TSG RAN WG1 #60bis R1-102265 Views on Wideband Long Term Feedback for SU-MIMO and MU-MIMO, Apr. 16, 2010, Beijing, China.

Chinese Search Report for Application No. 201080068987.0 dated Nov. 4, 2010.

International Search Report for PCT/CN2010/078425 dated Jun. 16, 2011.

Motorola, Precoding Feedback Overhead, 3 GPP TSG RAN WG1,TSGR1#48bis(07)1343, Mar. 26-30, 2007.

Motorola. Joint feedback for E-UTRA.downlink precoding and CQI, 3GPP TSG RAN1#48 bis,R1-071344, Mar. 26-30, 2007.

* cited by examiner

WIRELESS COMMUNICATION METHOD FOR A MU-MIMO SYSTEM, WIRELESS COMMUNICATION TERMINAL FOR COMMUNICATING WITH A BASE STATION IN A MU-MIMO SYSTEM, AND BASE STATION FOR COMMUNICATING WITH WIRELESS COMMUNICATION TERMINALS IN A MU-MIMO SYSTEM

TECHNICAL FIELD

The present disclosure relates to mobile communication.

BACKGROUND

MU-MIMO (Multiple User-Multiple Input Multiple Output) system is important means to increase peak data rate and spectral efficiency in current communication in which one main application is closed-loop downlink pre-coding. In such an application, when signals are sent to user equipment by multiple antennae located in a base station, the user equipment measures a downlink transmission channel from the base station to the user equipment, and then suggests a corresponding pre-coding matrix (index) for the base station based on the channel condition. The suggestion is transferred to the base station via a feedback link. Subsequently, during the downlink transmission, it is possible for the base station to directly adopt the suggested pre-coding matrix to pre-code the signal to be sent to the user equipment.

To facilitate MU-MIMO operation, advanced feedback schemes are being considered in 4G wireless standards, such as LTE-A. One of those advanced feedback schemes is BCI (Best Companion PMI (Pre-coding Matrix Index)).

In completed LTE Rel-8, the feedback scheme of PMI can well support for SU-MIMO (Single User-Multiple Input Multiple Output) system. By such feedback scheme, a UE (User equipment) reports the most preferred pre-coding matrix to be used for the UE itself to the base station. In the subsequent LTE standards such as LTE Rel-10, in addition to PMI, the UE also reports to the base station the most preferred pre-coding matrix to be used for other UEs, i.e. BCI, if the other UEs are co-scheduled with the UE.

FIG. 1 is a diagram showing a system in which a mobile UE reports PMI and BCI to a base station. In the MU-MIMO system as shown in the FIG. 1, when the base station 100 transmits signals to the UE 102 through antennae located in the base station 100, the UE 102 measures downlink transmission channel from the base station 100 to the UE 102, and then suggests a corresponding PMI for the base station 100 based on the channel condition. In addition to the PMI used for the UE 102 itself, the LIE 102 also reports to the base station 100 the most preferred BCI to be used for other UEs, such as the UE 104, co-scheduled with the UE 102.

FIG. 2 is a diagram showing the signaling for reporting BCI from the UE to the base station. As shown in the FIG. 2, similar to the feedback scheme of PMI and CQI (Channel Quality Indicator) in LTE Rel-8, in addition to BCI, the UE 102 also reports to the base station 100 ΔCQI (delta CQI) which indicates the CQI degradation due to the co-scheduling of the other UEs. In the FIG. 2, "t" denotes time and "T" denotes transmission cycle (period) of signaling, wherein the corresponding BCI and ΔCQI is transmitted from the UE 102 to the base station 100 every a certain cycle T.

According to some practical applications, BCI and ΔCQI may be fed back to the base station within the same signaling as or different signaling from that for feeding back the PMI and/or CQI.

FIG. 3 is a diagram showing a system in which a UE reports a PMI and multiple BCIs to a base station. In the MU-MIMO system as shown in the FIG. 3, the base station 300 respectively transmits the signals to multiple UEs 302, 304 and 306 through antennae located in the base station 300, and the UE 302 measures downlink transmission channel from the base station 300 to the UE 302, and suggests a corresponding PMI for the base station 300 based on the channel condition. In addition to the PMI used for the UE 302 itself, the UE 302 also reports to the base station 300 the most preferred BCIs, i.e. BCI1 and BCI2, to be used for the other two UEs 304 and 306 co-scheduled with the UE 302, respectively. Reporting multiple BCIs can greatly increase scheduling flexibility at base station side, thus improving MU-MIMO performance.

FIG. 4 is a diagram showing the signaling for reporting multiple BCIs to the base station from the UE. As shown in the FIG. 4, the UE 302 feeds back BCI1 and BCI2 to the base station 300 at the timings t1, t2, t3 and t4 respectively. In addition to BCI1 and BCI2, the UE 302 also reports the corresponding ΔCQI1 and ΔCQI2 to the base station 300. However, it can also be seen from the FIG. 4 that reporting multiple BCIs results in feedback overhead distinctly increasing. In the FIG. 4, the number of corresponding BCIs and ΔCQIs transmitted from the UE 302 to the base station 300 at a certain cycle T is two times of that of the FIG. 2.

SUMMARY OF THE DISCLOSURE

According to one aspect of the disclosure, there is provided a wireless communication method for a MU-MIMO system including a base station and a terminal communicating with the base station, the method comprising: transmitting a plurality of best companion pre-coding matrix indexs (BCIs) and corresponding delta channel quality indicators (ΔCQIs) from said terminal to said base station, wherein the period of frames for transmitting the plurality of BCIs is more than the period of frames for transmitting a single BCI.

According to another aspect of the disclosure, there is provided a wireless communication terminal for communicating with a base station in a MU-MIMO system, the wireless communication terminal comprising: a frame generation unit for generating frames for transmitting a plurality of best companion pre-coding matrix indexs (BCIs) and corresponding delta channel quality indicators (ΔCQIs) to said base station, wherein the period of frames for transmitting the plurality of BCIs is more than the period of frames for transmitting a single BCI.

According to a further aspect of the disclosure, there is provided a base station for communicating with wireless communication terminals in a MU-MIMO system, the base station comprising: a reception unit for receiving frames containing a plurality of best companion pre-coding matrix indexs (BCIs) and corresponding delta channel quality indicators (ΔCQIs) from the wireless communication terminal, wherein the period of frames for carrying the plurality of BCIs is more than the period of frames for carrying a single BCI.

According to another aspect of the disclosure, there is provided a wireless communication method for a MU-MIMO system including a base station and a terminal communicating with the base station, the method comprising: setting a best companion pre-coding matrix index (BCI) to be a predefined value, such predefined value may be constant or predefined with respect to the reported PMI value; and transmitting only a delta channel quality indicator (ΔCQI) corresponding to said BCI from said terminal to said base station at a predetermined cycle.

According to a further aspect of the disclosure, there is provided a wireless communication method for a MU-MIMO system including a base station and a terminal communicating with the base station, the method comprising: transmitting a delta channel quality indicator ($\Delta$CQI) from said terminal to said base station at a predetermined cycle; setting a threshold for said $\Delta$CQI; and additionally transmitting a best companion pre-coding matrix index (BCI) corresponding to said $\Delta$CQI from said terminal to said base station in response to the value of said $\Delta$CQI being smaller than or equaling to said threshold.

According to a further aspect of the disclosure, there is provided a wireless communication terminal for communicating with a base station in a MU-MIMO system, the wireless communication terminal comprising: a setting unit for setting a best companion pre-coding matrix index (BCI) to be a predefined value, such predefined value may be constant or predefined with respect to the reported PMI value; a frame generation unit for generating frames for transmitting a delta channel quality indicator ($\Delta$CQI) to said base station; and a transmission unit for transmitting frames containing only said $\Delta$CQI to said base station at a predetermined cycle.

According to a further aspect of the disclosure, there is provided a wireless communication terminal for communicating with a base station in a MU-MIMO system, the wireless communication terminal comprising: a frame generation unit for generating frames for transmitting a best companion pre-coding matrix index (BCI) and/or a corresponding delta channel quality indicator ($\Delta$CQI) to said base station; a setting unit for setting a threshold for said $\Delta$CQI; and a transmission unit for transmitting said frames at a predetermined cycle, wherein said frames contain both said BCI and said $\Delta$CQI when the value of said $\Delta$CQI is less than or equals to said threshold, while said frames contain only said $\Delta$CQI when the value of said $\Delta$CQI is more than said threshold.

According to a further aspect of the disclosure, there is provided a base station for communicating with wireless communication terminals in a MU-MIMO system, the base station comprising: a setting unit for setting a best companion pre-coding matrix indexs (BCI) to be a predefined value, such predefined value may be constant or predefined with respect to the reported PMI value; and a reception unit for receiving frames containing only a delta channel quality indicator ($\Delta$CQI) from the wireless communication terminal.

According to a further aspect of the disclosure, there is provided a base station for communicating with wireless communication terminals in a MU-MIMO system, the base station comprising: a reception unit for receiving frames containing a best companion pre-coding matrix index (BCI) and/ or a corresponding delta channel quality indicator ($\Delta$CQI) from the wireless communication terminal, wherein the received frames contain both said BCI and said $\Delta$CQI when the value of said $\Delta$CQI is less than or equals to a set threshold, while the received frames contain only said $\Delta$CQI when the value of said $\Delta$CQI is more than said threshold.

According to a further aspect of the disclosure, there is provided a wireless communication method for communicating with a base station in a multiple user-multiple input and multiple output system, comprising steps of: transmitting a PMI, plural BCIs, and a $\Delta$CQI to the base station, the $\Delta$CQI is calculated by making power assignment approximate the actual downlink transmission power assignment at the base station, wherein, the PMI represents pre-coding matrix preferred to be used for a mobile terminal, the BCI represents best companion pre-coding matrix preferred to be used for other mobile terminals possibly paired with the mobile terminal, and $\Delta$CQI represents a channel quality degradation due to use of the plural BCIs.

According to a further aspect of the disclosure, there is provided a mobile terminal for communicating with a base station in a multiple user-multiple input and multiple output system, comprising: a frame generation unit which generates frames for transmitting a PMI, plural BCIs, and a $\Delta$CQI to the base station; and a calculation unit which calculates the $\Delta$CQI by making power assignment approximate the actual downlink transmission power assignment at the base station, wherein, the PMI represents pre-coding matrix preferred to be used for the mobile terminal, the BCI represents best companion pre-coding matrix preferred to be used for other mobile terminals possibly paired with the mobile terminal, and $\Delta$CQI represents a channel quality degradation due to use of the plural BCIs.

According to a further aspect of the disclosure, there is provided a base station for communicating with plural mobile terminals in a multiple user-multiple input and multiple output system, comprising: a receiving unit which receives frames containing a PMI, plural BCIs, and a $\Delta$CQI from a mobile terminal, wherein the $\Delta$CQI is calculated by making power assignment approximate the actual downlink transmission power assignment at the base station; and a processing unit which performs a pre-coding operation with respect to the plural mobile terminals in consideration of the PMI, the plural BCIs, and the $\Delta$CQI, wherein, the PMI represents pre-coding matrix preferred to be used for the mobile terminal, the BCI represents best companion pre-coding matrix preferred to be used for other mobile terminals possibly paired with the mobile terminal, and $\Delta$CQI represents a channel quality degradation due to use of the plural BCIs.

The method for feeding back BCI and corresponding $\Delta$CQI in the present disclosure can greatly increase scheduling flexibility at the base station side and improve MU-MIMO performance without increasing feedback overhead of channels.

The foregoing is a summary and thus contains, by necessity, simplifications, generalization, and omissions of details; consequently, those skilled in the art will appreciate that the summary is illustrative only and is not intended to be in any way limiting. Other aspects, features, and advantages of the devices and/or processes and/or other subject matters described herein will become apparent in the teachings set forth herein. The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
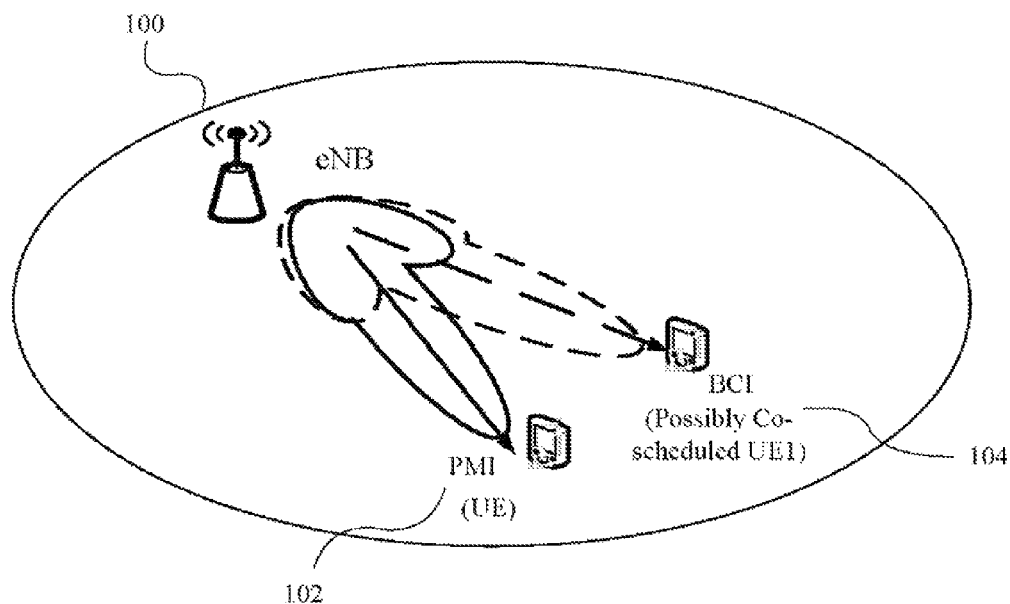
FIG. 1 is a diagram showing a system in which the UE reports PMI and BCI to the base station.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

The First Embodiment

Figure 5:
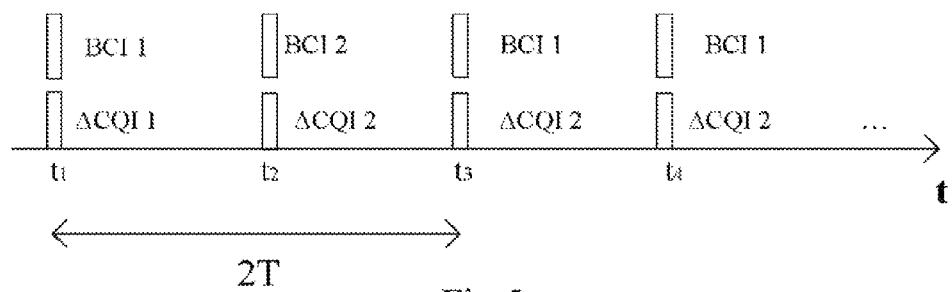
FIG. 5 is a diagram showing the signaling for reporting multiple BCIs to the base station from the UE according to the first embodiment of the present disclosure.

FIG. 5 is a diagram showing the signaling for reporting multiple BCIs to the base station from the UE according to the first embodiment of the present disclosure. According to one embodiment of the present disclosure, in the MU-MIMO system including a base station and multiple UEs communicating with the base station, the feedback cycle may be appropriately increased in the case of reporting the multiple BCIs to the base station from the UE in order to maintain the same feedback overhead as that when feeding back one BCI. That is, the wireless communication method according to the present disclosure may include the step of transmitting the multiple BCIs and the corresponding $\Delta CQI$s to the base station from the UE, wherein the period (feedback cycle) of frames for transmitting the multiple BCIs is more than the period of frames for transmitting a single BCI. According to the embodiment, assuming that the period of the frames for transmitting (feeding back or reporting) one (single) BCI is T, the period of the frames for transmitting the multiple BCIs may be multiple of the period of frames for transmitting the single BCI, T. For example, when reporting two BCIs to the base station from the UE, the feedback cycle may be twice as much as that when reporting one BCI, i.e. 2T. The specific value of the above multiple is not limiting the scope of the present disclosure, and those skilled in the art may set practically the specific value of the multiple in accordance with the specific requirements of the system.

As shown in the FIG. 5, the periods between the timings t1, t2, t3, t4 and so on are cycle T. The reporting is performed periodically as follows: the frames for feeding back the first BCI (BCI1) and a first $\Delta CQI$ ($\Delta CQI1$) are transmitted at the timing t1, the frames for feeding back the second BCI (BCI2) and the second $\Delta CQI$ ($\Delta CQI2$) are transmitted at the timing t2, the frames for feeding back BCI1 and $\Delta CQI1$ are transmitted again at the timing t3, the frames for feeding back BCI2 and $\Delta CQI2$ are transmitted again at the timing t4, and so on. It can be seen that the period of the frames for transmitting the first BCI of the above two (or possibly multiple) BCIs is 2T, and that the period of the frames for transmitting the second BCI of the above two (or possibly multiple) BCIs is also 2T. Furthermore, it can be seen from the FIG. 5 that the first $\Delta CQI$ can be transmitted within the frames for transmitting the first BCI, and the second $\Delta CQI$ can be transmitted within the frames for transmitting the second BCI. Further, the period between the frames for transmitting the second BCI and the frames for transmitting the first BCI is T. As a result, the period for reporting BCI1, BCI2, $\Delta CQI1$ and $\Delta CQI2$ is doubled so as to control the feedback overhead to be the same as the case of reporting one BCI and $\Delta CQI$ to the base station.

In this way, compared with the prior art, the method for reporting the multiple BCIs in the present embodiment can greatly increase scheduling flexibility at the base station side and thus improve MU-MIMO performance without increasing feedback overhead of channels.

Figure 6:
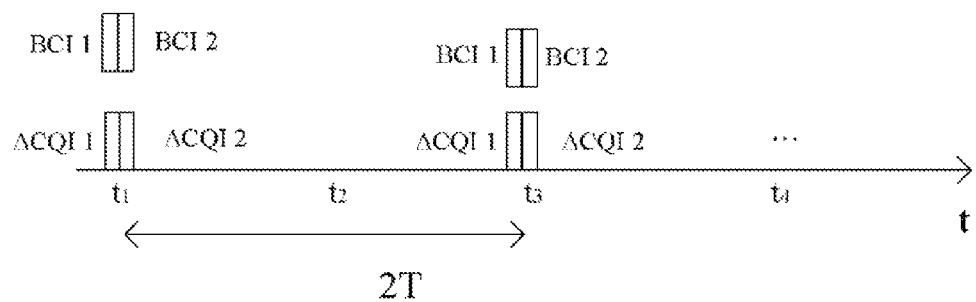
FIG. 6 is another diagram showing the signaling for reporting multiple BCIs to the base station from the UE according to the first embodiment of the present disclosure.

FIG. 6 is another diagram showing the signaling for reporting the multiple BCIs to the base station from the UE according to the first embodiment of the present disclosure. According to another embodiment of the disclosure, as shown in the FIG. 6, the periods between the timings t1, t2, t3, t4 and so on are a cycle T. The reporting is performed periodically as follows: the frames for feeding back BCI1, ΔCQI1, BCI2 and ΔCQI2 are transmitted at the timing t1, none of the above frames is transmitted at the timing t2, and the frames for feeding back BCI1, ΔCQI1, BCI2 and ΔCQI2 are transmitted again at the timing t3, none of the above frames is transmitted at the timing t4, and so on. It can be seen from the FIG. 6 that the first ΔCQI (ΔCQI1) can be transmitted within the frames for transmitting the first BCI (BCI1), and the second ΔCQI (ΔCQI2) can be transmitted within the frames for transmitting the second BCI (BCI2), and that the period between the frames for transmitting the second BCI and the frames for transmitting the first BCI is zero. As a result, the period for reporting BCI1, BCI2, ΔCQI1 and ΔCQI2 is doubled so as to control the feedback overhead to be the same as the case of reporting one BCI and ΔCQI to the base station.

In this way, compared with the prior art, the method for reporting the multiple BCIs in the present embodiment can greatly increase scheduling flexibility at the base station side and thus improve MU-MIMO performance without increasing feedback overhead of channels.

The Second Embodiment

Increasing the feedback cycle may cause a BCI aging problem, that is, the current BCI may not be able to reflect the channel condition accurately before the next BCI is received by the base station.

For example, with respect to the case as shown in the FIG. 5, as for BCI1 and ΔCQI1, BCI1 is not aged between the timing 0 and timing T (i.e. t1-t2), but may be aged (BCI2 is not aged at the time) between the timing T and timing 2T (i.e. t2-t3). As for BCI2 and ΔCQI2, BCI2 is not aged (BCI1 may be aged at the time) between the timing 0 and timing T (i.e. t2-t3), but may be aged (BCI1 is not aged at the time) between the timing T and timing 2T (i.e. t3-t4), as shown in the Table 1 below.

TABLE 1

|  | 0 to T | T to 2T |
|---|---|---|
| BCI1/ΔCQI1 | Not aged | May be aged |
| BCI2/ΔCQI2 | May be aged | Not aged |

With respect to the case as shown in the FIG. 6, as for BCI1, ΔCQI1, BCI2 and ΔCQI2, the BCI1 and BCI2 are neither aged between the timing 0 and timing T (i.e. t1-t2), but may both be aged between the timing T and timing 2T (i.e. t2-t3), as shown in the Table 2 below.

TABLE 2

|  | 0 to T | T to 2T |
|---|---|---|
| BCI1/ΔCQI1 | Not aged | May be aged |
| BCI2/ΔCQI2 | Not aged | May be aged |

In case that the BCI1 and BCI2 reported from the UE 302 to the base station 300 are aged, the BCI1 and BCI2 fail to reflect accurately the channel condition, that is, the BCI preferred by the UE 302 to be used for the other UEs 304 and 306 co-scheduled with the UE 302. In this case, if the base station 300 still uses the aged BCI1 or BCI2 to pre-code the other UEs 304 and 306 co-scheduled with the UE 302, the UE 302 will be adversely influenced.

As described above, the value of ΔCQI represents decline in the channel quality due to the co-scheduling of the UEs. According to one embodiment of the disclosure, the value of ΔCQI can be represented by Table 3 below.

TABLE 3

| ΔCQI | b1 | b2 | b3 |
|---|---|---|---|
| 0 | 1 | 1 | 1 |
| −1 | 1 | 1 | 0 |
| −2 | 1 | 0 | 1 |
| −3 | 1 | 0 | 0 |
| −4 | 0 | 1 | 1 |
| −5 | 0 | 1 | 0 |
| −6 | 0 | 0 | 1 |
| −7 | 0 | 0 | 0 |

It can be seen from the Table 3 that the value of ΔCQI can be represented by three bits b1, b2 and b3 (the number of bits for representing the value of ΔCQI is not limiting the scope of the present disclosure, and the value of ΔCQI can be represented by more or less than three bits) as totally eight values from 0 to −7. The highest value 0 can represent the channel condition being good, and the lowest value −7 can represent the channel condition being extremely bad.

It can be assumed that a value of ΔCQI fed back to the base station 300 from the UE 302 represents that the corresponding BCI is aged if the value is less than a certain threshold (which may be any one of the eight values from 0 to −7, and may, here for example, be set as −4). Upon receiving a ΔCQI lower than the certain threshold, the base station 300 understands that the BCI corresponding to the ΔCQI fed back by the UE 302 previously is aged, and no more utilizes the BCI to pre-code the corresponding UE 304 and/or UE 306.

To resolve the BCI aging problem, in the present disclosure, ΔCQI is reported to a base station at a cycle shorter than that of BCI. For example, the feedback cycle for BCI is 2T, and the feedback cycle for ΔCQI is T.

Figure 7:
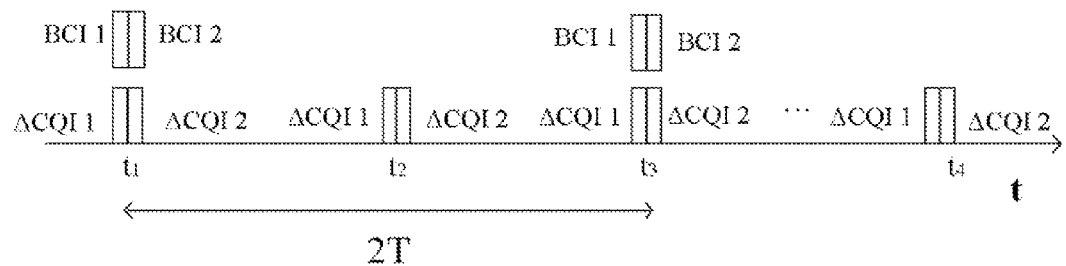
FIG. 7 is a diagram showing the signaling for reporting multiple BCIs to the base station from the UE according to the second embodiment of the present disclosure.

FIG. 7 is a diagram showing the signaling for reporting the multiple BCIs to the base station from the UE according to the second embodiment of the present disclosure.

In the present embodiment, to resolve the BCI aging problem, the feedback cycle for BCI is set to 2T, and the feedback cycle for ΔCQI is set to T. As shown in the FIG. 7, the period between the timings t1, t2, t3 and t4 is cycle T. The reporting is performed periodically as follows: the frames for feeding back BCI1, ΔCQI1, BCI2 and ΔCQI2 are transmitted at the timing t1, only the frames for feeding back ΔCQI1 and ΔCQI2 are transmitted at the timing t2, the frames for feeding back BCI1, ΔCQI1, BCI2 and ΔCQI2 are transmitted again at the timing t3, only the frames for feeding back ΔCQI1 and ΔCQI2 are transmitted again at the timing t4, and so on. That is to say, the first ΔCQI (ΔCQI1) can be transmitted within the frames for transmitting the first BCI (BCI1) and the second ΔCQI (ΔCQI2) can be transmitted within the frames for transmitting the second BCI (BCI2), and the frames for transmitting the first ΔCQI and the second ΔCQI may be added between two adjacent frames for transmitting the first BCI (for example, at the midpoint of the period).

Thereby, the cycle for reporting BCI1 and BCI2 is doubled, and the cycle for reporting ΔCQI1 and ΔCQI2 is still remained as T. In this way, the base station 300 can be assured to receive the reports of valid state with respect to whether each BCI is aged or not from the UE 302 in every cycle T, thus assuring the effective pre-coding of respective UEs 302, 304 and 306.

Figure 4:
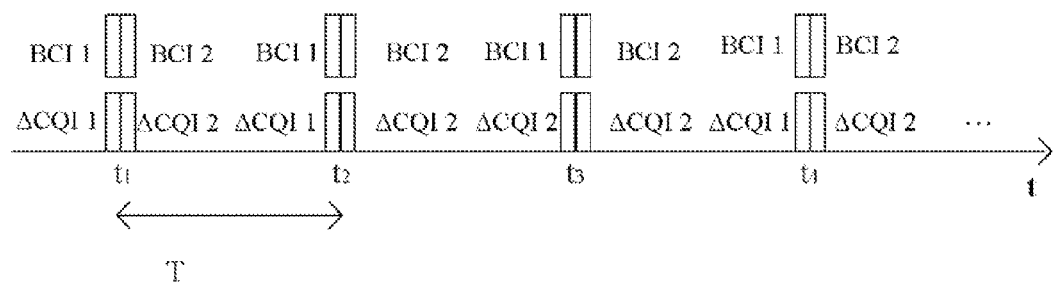
FIG. 4 is a diagram showing the signaling for reporting multiple BCIs to the base station from the UE.

Compared with the FIG. 4, the present embodiment reduces the feedback overhead due to the doubling of cycle for feeding back BCI1 and BCI2, meanwhile may avoid using the aged BCI to pre-code so as to increase scheduling flexibility at the base station side and thus improve MU-MIMO performance due to retaining the feedback cycle for $\Delta$CQI1 and $\Delta$CQI2 as T to allow the base station know the aging situation of BCI.

The Third Embodiment

On the basis of the second embodiment, to further reduce the feedback overhead, the present embodiment proposes a method for binding the first $\Delta$CQI with the second $\Delta$CQI. That is to say, only the $\Delta$CQI with lower value, herein referred to as the worst $\Delta$CQI, of the first $\Delta$CQI and second $\Delta$CQI is reported in each frame. That is to say, the frames for transmitting the first BCI or the frames for transmitting the second BCI can be used to transmit only the $\Delta$CQI with lower value of the first $\Delta$CQI and second $\Delta$CQI, and the frames for transmitting the $\Delta$CQI with lower value are added between the frames for transmitting the first BCI (for example, at the midpoint of the period).

Figure 8:
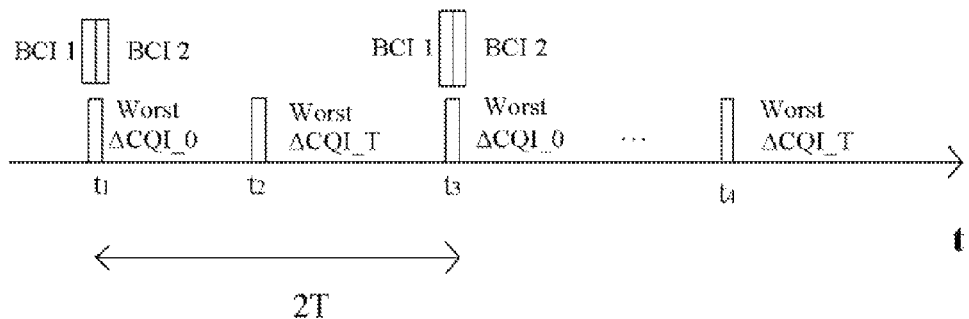
FIG. 8 is a diagram showing the signaling for reporting multiple BCIs to the base station from the UE according to the third embodiment of the present disclosure.

FIG. 8 is a diagram showing the signaling for reporting the multiple BCIs to the base station from the UE according to the third embodiment of the present disclosure. As shown in the FIG. 8, a worst $\Delta$CQI reported in the same frame as BCI1 or BCI2 is referred to as $\Delta$CQI_0, for example a worst $\Delta$CQI fed back at the timings t1 and t3, while a worst $\Delta$CQI reported in a different frame from BCI1 or BCI2 is referred to as $\Delta$CQI_T, for example a worst $\Delta$CQI fed back at the timings t2 and t4.

Note that in the cycle of 2T from t1 to t3, the channel condition at the timing t2 is worse than that at the timing t1 due to experience of time fading such that it can be known that the value of $\Delta$CQI_T must be lower than that of $\Delta$CQI_0. In this way, if the value of the worst $\Delta$CQI_T fed back at the timing t2 and t4 is higher than a certain threshold (for example, −4), the base station 300 knows that both BCI1 and BCI2 are not aged. On the other hand, if the value of $\Delta$CQI_T is lower than or equals to a certain threshold (for example, −4), the base station 300 knows that at least one BCI is aged.

According to the present embodiment, in the case of further reducing the feedback overhead for $\Delta$CQI1 and $\Delta$CQI2, scheduling flexibility at the base station side is still increased and MU-MIMO performance is improved.

The Fourth Embodiment

Figure 9:
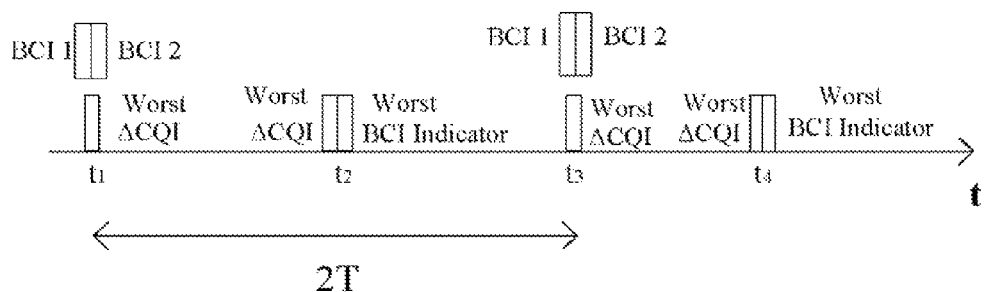
FIG. 9 is a diagram showing the signaling for reporting multiple BCIs to the base station from the UE according to the fourth embodiment of the present disclosure.

FIG. 9 is a diagram showing the signaling for reporting the multiple BCIs to the base station from the UE according to the fourth embodiment of the present disclosure.

In the case as shown in the FIG. 8, if the value of $\Delta$CQI_T is lower than or equals to a certain threshold (for example, −4), the base station 300 knows that at least one BCI is aged. However, the base station 300 does not know which BCI is aged. Therefore, the base station 300 needs to know which BCI is aged in order to pre-code more accurately.

As shown in the FIG. 9, according to an embodiment of the present disclosure, a specific BCI indicator is assigned to the frames for transmitting the $\Delta$CQI with lower value (i.e. $\Delta$CQI_T) added between the frames for transmitting the first BCI (for example, at the midpoint of the period) in the third embodiment to indicate an aged BCI. That is, in addition to $\Delta$CQI_T, the UE 302 further uses for example one bit of "worst BCI indicator" to feed back the aged BCI to the base station 300. Thus, the base station 300 knows which BCI is aged.

According to the present embodiment, although the overhead of one bit for feeding back the worst BCI indicator is increased compared with the third embodiment, BCI is fed back more accurately so as to greatly increase scheduling flexibility at the base station side and improve MU-MIMO performance without significantly increasing feedback overhead.

The Fifth Embodiment

Figure 10:
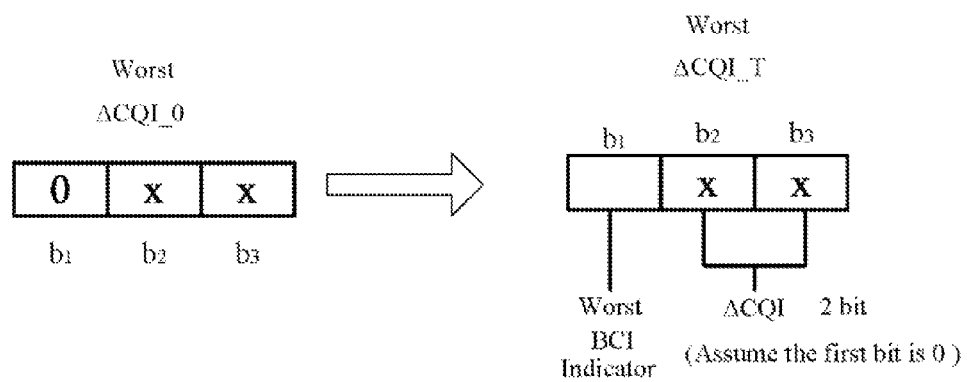
FIG. 10 is a diagram showing format for reporting a worst BCI indicator by using the first bit "b1" of $\Delta CQI\_T$ according to the fifth embodiment of the present disclosure.

FIG. 10 is a diagram showing format for reporting the worst BCI indicator by using the first bit "b1" of $\Delta$CQI_T according to the fifth embodiment of the present disclosure.

It can be seen with reference to the Table 3 that when the first bit B1 of $\Delta$CQI_0 is 0, the first bit "b1" of $\Delta$CQI_T with lower value is always 0. Also in practical applications, all cases of requiring reporting the worst BCI indicator are almost occur at the time when the first bit "b1" of $\Delta$CQI_0 is 0 (that is, when the value of $\Delta$CQI_0 is lower). Thereby, it is proposed in the present disclosure that the first bit "b1" of $\Delta$CQI_T is used to report the worst BCI indicator when the first bit "b1" of $\Delta$CQI_0 is 0. That is to say, according to the present disclosure, the specific BCI indicator above, i.e. the worst BCI indicator, can be written to the position of the significant bit (b1) of bits representing the value of the above $\Delta$CQI with lower value.

As shown in the FIG. 10, when the first bit "b1" of $\Delta$CQI_0 is 0, since the first bit "b1" of $\Delta$CQI_T with lower value is always 0, the position of the first bit "b1" of $\Delta$CQI_T is rewritten with the worst BCI indicator, thereby reporting the aged BCI to the base station 300.

The method can report $\Delta$CQI_T and the worst BCI indicator simultaneously without increasing overhead so as to greatly increase scheduling flexibility at the base station side and improve MU-MIMO performance without increasing feedback overhead.

The Sixth Embodiment

Figure 11:
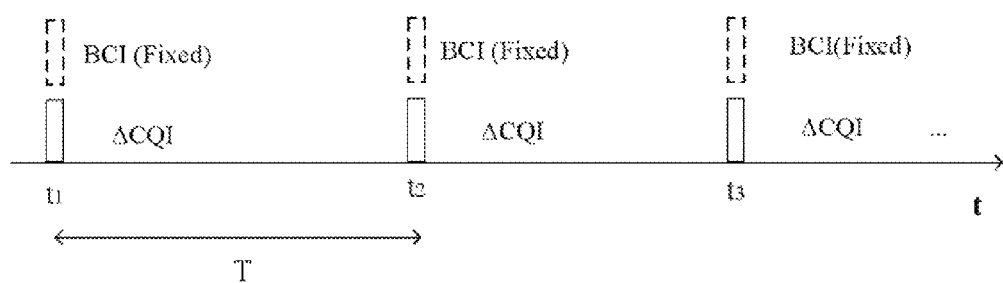
FIG. 11 is a diagram showing the signaling for reporting BCI and $\Delta CQI$ to the base station from the mobile terminal according to the sixth embodiment of the present disclosure.

FIG. 11 is a diagram showing the signaling for reporting BCI and $\Delta$CQI to the base station from the mobile terminal according to the sixth embodiment of the present disclosure.

Figure 2:
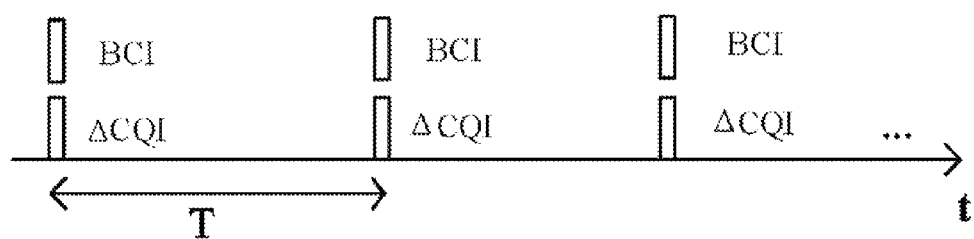
FIG. 2 is a diagram showing the signaling for reporting BCI to the base station from the UE.
Figure 3:
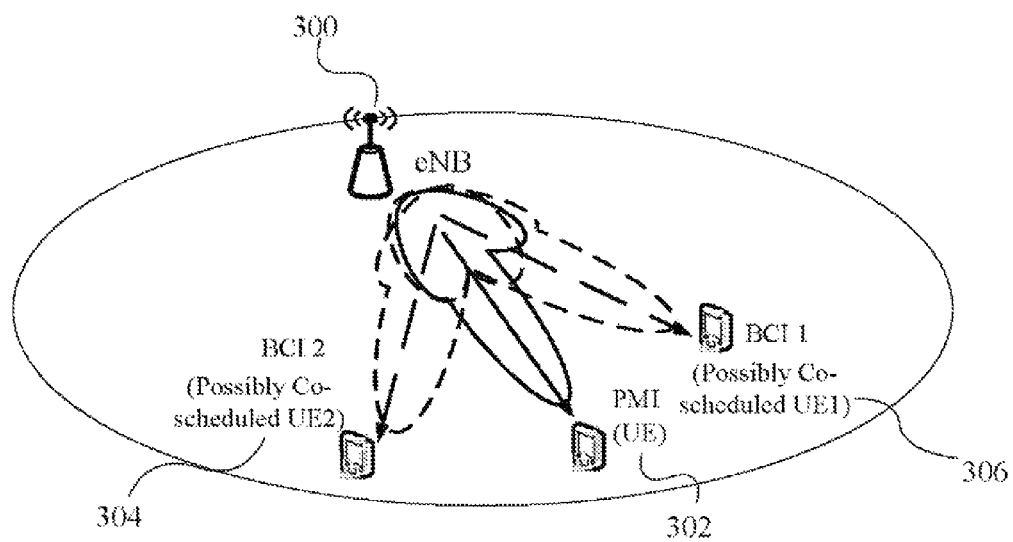
FIG. 3 is a diagram showing a system in which a UE reports PMI and multiple BCIs to the base station.

In the FIG. 2 as shown previously, the situation of reporting one BCI and the corresponding $\Delta$CQI to the base station from the mobile terminal is shown. Considering that in order to save overhead, the BCI may also be set to a fixed value which is known on both the base station and the mobile terminal. When reporting to the base station, the mobile terminal can transmit the frames including only $\Delta$CQI to the base station at the predetermined cycle. The base station can pre-code another mobile terminal possibly co-scheduled with the mobile terminal in accordance with the fixed BCI as set above and $\Delta$CQI received from the mobile terminal.

In the FIG. 11, the situation of transmitting $\Delta$CQI for only one BCI to the base station from the mobile terminal is shown, in which the frames containing only $\Delta$CQI are transmitted to the base station from the mobile terminal at a predetermined cycle T. Furthermore, since the BCI is set to a fixed value, the value of the BCI may not be reported to the base station.

Figure 12:
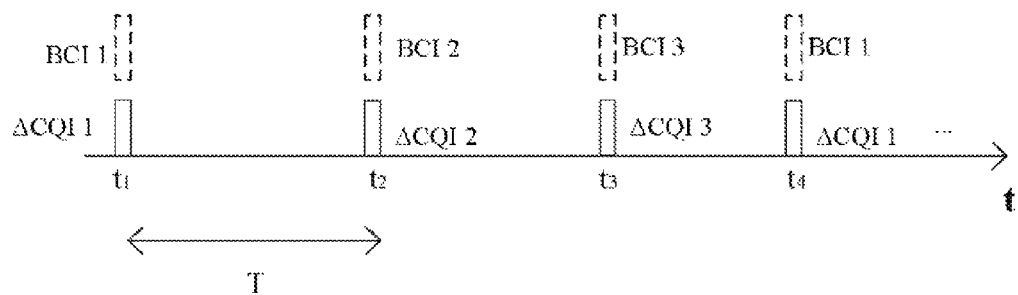
FIG. 12 is another diagram showing the signaling for reporting BCI and $\Delta CQI$ to the base station from the mobile terminal according to the sixth embodiment of the present disclosure.

FIG. 12 is another diagram showing the signaling for reporting BCI and $\Delta$CQI to the base station from the mobile terminal according to the sixth embodiment of the present disclosure.

In the FIG. 12, the situation of transmitting ΔCQIs for multiple BCIs to the base station from the mobile terminal is shown. Specifically, FIG. 12 is aimed at the case of transmitting three BCIs and the corresponding ΔCQIs to the base station from the mobile terminal. To save overhead, the transmitting cycle for the three BCIs and corresponding ΔCQIs can be set to multiple of that for transmitting a single BCI, as described in several embodiments depicted previously in the specification of the present disclosure. Herein, the transmitting cycle is set to 3T. As shown in the FIG. 12, the period between the timings t1, t2, t3 and t4 is cycle T. The reporting is performed periodically as follows: the frames for feeding back BCI1 and ΔCQI1 may be transmitted at the timing t1, the frames for feeding back BCI2 and ΔCQI2 are transmitted at the timing t2, the frames for feeding back BCI3 and ΔCQI3 are transmitted at the timing t3, the frames for feeding back BCI1 and ΔCQI1 are started being transmitted again at the timing t4, and so on.

However, according to the present embodiment, considering that in order to further save overhead, the above BCI1, BCI2 and BCI3 may also be respectively set to fixed values which are known on both the base station and the mobile terminal. The values of BCI1, BCI2 and BCI3 may also be specified by a predefined mapping between PMI and BCI(s). When reporting to the base station, the mobile terminal can transmit the frames including only ΔCQIs corresponding to the respective BCIs to the base station at a predetermined cycle. The base station can pre-code other mobile terminals (assumed to three herein) possibly co-scheduled with the mobile terminal in accordance with the respective fixed BCIs as set above and corresponding ΔCQIs received from the mobile terminal.

In the FIG. 12, the frames containing only ΔCQI1, ΔCQI2 and ΔCQI3 are transmitted at the predetermined cycle T to the base station from the mobile terminal at the timings t1, t2, t3 and t4, respectively. Further, since the BCI1, BCI2 and BCI3 are respectively set to fixed values, the values of the BCI1, BCI2 and BCI3 may not be reported to the base station.

Thus, in the wireless communication method according to the present embodiment, the BCIs is set to a constant (fixed) value, and only the ΔCQIs corresponding to the BCIs set to a constant value are transmitted to the base station from the mobile terminal.

Also, in the wireless communication method according to the FIG. 12, the number of BCIs set to constant values and the corresponding ΔCQIs may be multiple (not limited to three as shown in the FIG. 12), and according to several embodiments of the present disclosure as described above, the period of the frames for transmitting the ΔCQIs is larger than the period of the frames for transmitting a single ΔCQI In this way, the feedback overhead is reduced, scheduling flexibility at the base station side is increased, and MU-MIMO performance is improved.

The Seventh Embodiment

Figure 13:
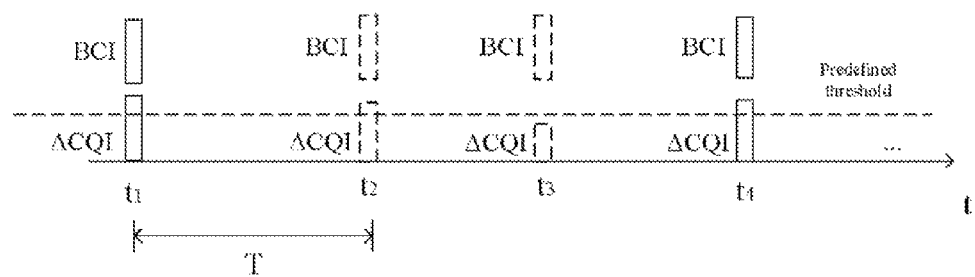
FIG. 13 is a diagram showing the signaling for reporting BCI and $\Delta CQI$ to the base station from the mobile terminal according to the seventh embodiment of the present disclosure.

FIG. 13 is a diagram showing the signaling for reporting BCI and ΔCQI to the base station from the mobile terminal according to the seventh embodiment of the present disclosure.

As shown in the FIG. 2 above, the situation of reporting one BCI and the corresponding ΔCQI to the base station from the mobile terminal is illustrated. Considering that in order to save overhead, a threshold can be set for ΔCQI, when the value of ΔCQI is more than the threshold, it is indicated that the BCI transmitted before is not aged and is still a valid BCI. Then, the mobile terminal may no more transmit BCI, and the base station can use the BCI transmitted before to pre-code for the corresponding mobile terminal. When the value of ΔCQI is less than or equals to the threshold, it is indicated that the BCI transmitted before is aged and is no more a valid BCI. Then, the mobile terminal needs to transmit a new BCI within a frame in the next cycle, and the base station can use the newly transmitted BCI to pre-code for the corresponding mobile terminal.

In the FIG. 13, a broken line indicates a threshold set for ΔCQI. At the timing t1, the mobile terminal transmits BCI and the corresponding ΔCQI to the base station. At the timing t2, the value of the ΔCQI is compared with the threshold at the mobile terminal, and the result of comparison is that the value of the ΔCQI is more than the threshold. Then, it is indicated that the BCI transmitted at the timing t1 is acceptable and does not need to be updated. Thus, the mobile terminal no more transmits BCI and the corresponding ΔCQI to the base station. At the timing t3, the value of the ΔCQI is compared with the threshold at the mobile terminal, and the result of comparison is that the value of the ΔCQI is less than the threshold. Then, it is indicated that the BCI transmitted at the timing t1 is unacceptable and needs to be updated. Thus, the mobile terminal transmits a new BCI and the corresponding ΔCQI to the base station at the timing t4 in the next cycle.

Figure 14:
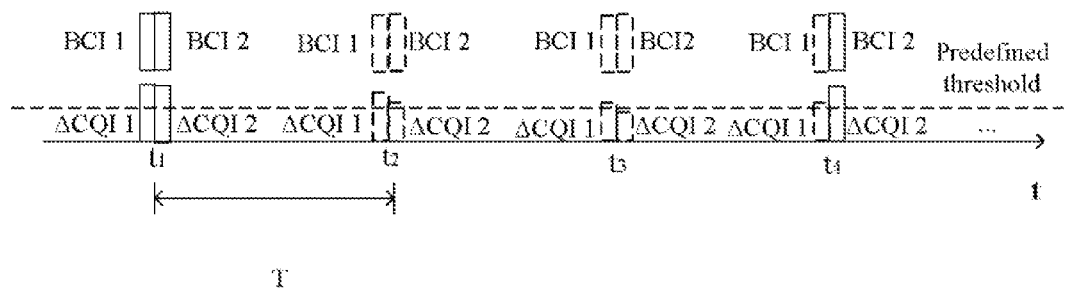
FIG. 14 is another diagram showing the signaling for reporting BCI and $\Delta CQI$ to the base station from the mobile terminal according to the seventh embodiment of the present disclosure.

FIG. 14 is another diagram showing the signaling for reporting BCI and ΔCQI to the base station from the mobile terminal according to the seventh embodiment of the present disclosure.

In the FIG. 14, the situation of transmitting multiple, specifically two, BCIs and the corresponding ΔCQIs to the base station from the mobile terminal is shown. In the FIG. 14, the period between the timings 0, t2, t3 and t4 is a cycle T, and the frames for feeding back BCI1 and ΔCQI1 as well as BCI2 and ΔCQI2 are transmitted at the timing 0. At the timing t2, the values of ΔCQI1 and ΔCQI2 are compared with the threshold at the mobile terminal, and results of comparison is that the value of ΔCQI1 is more than the threshold and the value of ΔCQI2 is also more than the threshold, which indicates that BCI1 and BCI2 transmitted at the timing t1 are acceptable and do not need to be updated. Thus, the mobile terminal does not transmit BCI1 and BCI2 as well as the corresponding ΔCQI1 and ΔCQI2 to the base station. At the timing t3, the values of ΔCQI1 and ΔCQI2 are compared with the threshold at the mobile terminal, and results of comparison is that the value of ΔCQI1 is more than the threshold and the value of ΔCQI2 is less than the threshold, which indicates that BCI2 transmitted at the timing t1 is unacceptable and needs to be updated. Thus, the mobile terminal transmits a new BCI2 and the corresponding ΔCQI2 to the base station at the timing t4. Since the value of ΔCQI1 is more than the threshold at the timing t3 and thus does not need to be updated, the mobile terminal no more transmits a new BCI1 and the corresponding ΔCQI1 to the base station at the timing t4.

Therefore, in the wireless communication method according to the present embodiment, the multiple ΔCQIs are transmitted to the base station from the mobile terminal at a pre-determine cycle, and a threshold for the ΔCQI is set. When the value of the ΔCQI is less than or equals to the threshold, in addition to the ΔCQI, the BCI corresponding to the ΔCQI is transmitted to the base station from the mobile terminal.

In this way, the feedback overhead is reduced, scheduling flexibility at the base station side is increased, and MU-MIMO performance is improved.

The Eighth Embodiment

In this embodiment, how to calculate the ΔCQI will be discussed. As described with reference to the FIG. 4, reporting multiple BCIs can quite further improve MU-MIMO performance compared with single BCI reporting due to the greatly increased scheduling flexibility. However, reporting overhead is increased if the BCI reporting periodicity remains the same.

Figure 15:
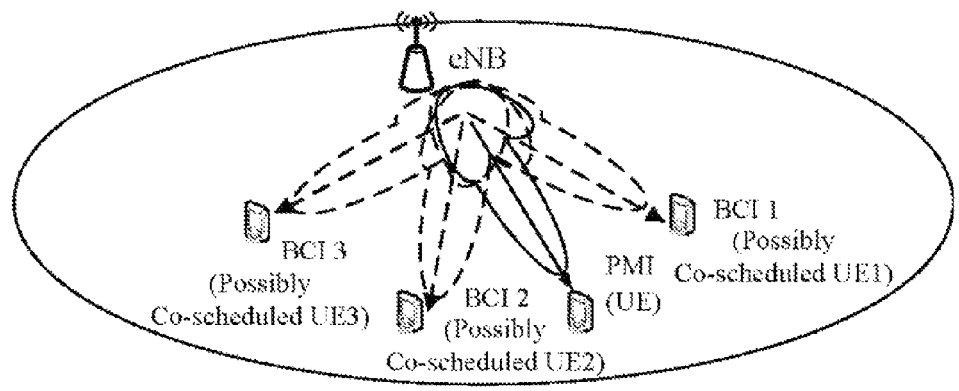
FIG. 15 shows another schematic diagram of a system that the mobile terminal reports a PMI and multiple BCIs to the base station.
Figure 16:
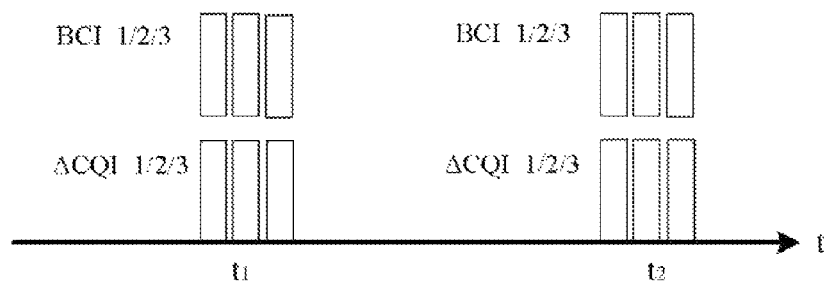
FIG. 16 shows another diagram of reporting the multiple BCIs and $\Delta CQI$s from the mobile terminal to the base station.

FIG. 15 shows a diagram of a system that the mobile terminal reports a PMI and multiple BCIs to the base station, and FIG. 16 shows another diagram of reporting the multiple BCIs and ΔCQIs from the mobile terminal to the base station.

In some cases, the overhead of ΔCQI is particularly concerned. For example, in the reporting mode PUSCH 3-1 (wideband BCI/sub-band ΔCQI), the BCI is wideband information, while the ΔCQI is sub-band information. In such a case, as shown in the following Table 4, increasing the number of ΔCQI from one to three would almost double the feedback overhead. Therefore, how to reduce the overhead of ΔCQI is an important topic in the BCI reporting.

TABLE 4

| CSI | Number of bits |
| --- | --- |
| PMI - wideband | 4 |
| CQI - wideband | 4 |
| CQI - subband | 2*13 |
| BCI1/2/3 - wideband | 4 + 4 + 4 |
| Delta CQI - subband | (3 + 3 + 3)*13 |

Figure 17:
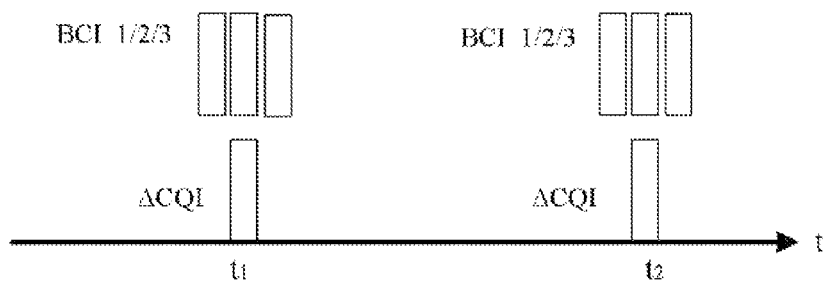
FIG. 17 shows another diagram of reporting the multiple BCIs and one $\Delta CQI$ from the mobile terminal to the base station.

FIG. 17 shows another diagram of reporting the multiple BCIs and one ΔCQI from the mobile terminal to the base station. Generally, reducing ΔCQI overhead implies reporting a single ΔCQI with respect to the multiple BCIs, as shown in the FIG. 17.

However, there are multiple ways to determine such a ΔCQI. For example, the most straightforward way is simply to average the multiple ΔCQIs. There are actually multiple ways to average the multiple ΔCQIs. For example, the median value of the multiple ΔCQIs can be selected. Or, the corresponding SINR of each ΔCQI (actually both CQI and ΔCQI) can be found, then those SINRs can be averaged and the average SINR can be mapped to a new ΔCQI. Another method is to average the BLER of the multiple ΔCQIs and the average BLER can be mapped to a new ΔCQI. However, in the LTE/LTE-A standard, all of those averaging method can not pass RAN4 testing procedure. In other words, if the base station (eNB) adopts the feedback, the BLER of the intended UE can not be guaranteed less than 10%. Therefore, the simply averaging is simple and reasonable but not testable.

It should be noted that for fair comparison, the transmission power is split among the multiple UEs. For each ΔCQI, the transmission power is equally split among the associated BCIs and PMI, as shown in the following Table 5.

TABLE 5

| PMI | BCI1 | BCI2 | BCI3 | ΔCQI |
| --- | --- | --- | --- | --- |
| P/2 | P/2 | 0 | 0 | ΔCQI_1 |
| P/2 | 0 | P/2 | 0 | ΔCQI_2 |
| P/2 | 0 | 0 | P/2 | ΔCQI_3 |

To pass the RAN4 testing, it is possible to report the most conservative ΔCQI among the multiple ΔCQIs. The table 5 shows that the UE calculates one ΔCQI with respect to each BCI. For example, the UE calculates ΔCQI_1 for BCI1, ΔCQI_2 for BCI2, and ΔCQI_3 for BCI3. The UE reports one ΔCQI such as ΔCQI_3 which indicates the worst channel degradation to the base station, and the transmission power will be split between the PMI and the reported ΔCQI. Such reporting is testable, but it is so conservative that sometimes the MU performance is degraded.

Figure 18:
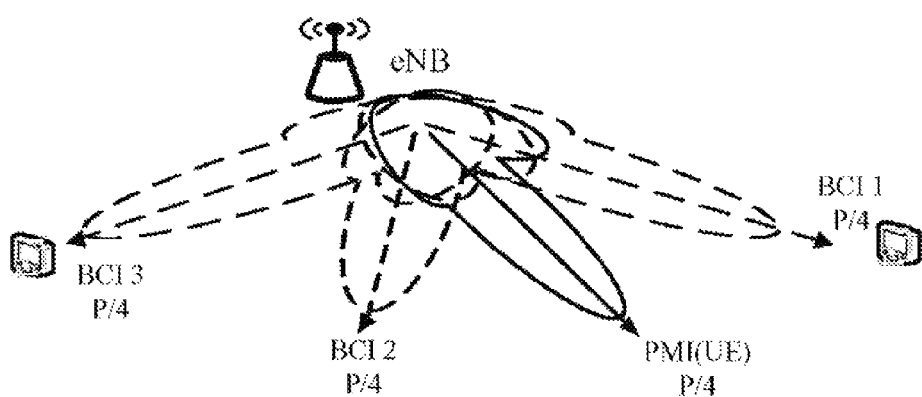
FIG. 18 shows an example of calculating $\Delta CQI$ with respect to the multiple BCIs.

FIG. 18 shows an example of calculating ΔCQI with respect to the multiple BCIs. A testable method is to report a ΔCQI assuming the simultaneous existence of multiple spatial interferences. It assumes that equal power is allocated among all transmission layers. For example, if there are three BCIs and one PMI, the resulted power per layer would be P/4, as shown in the following Table 6 and the FIG. 18.

TABLE 6

| PMI | BCI1 | BCI2 | BCI3 | ΔCQI |
| --- | --- | --- | --- | --- |
| P/4 | P/4 | P/4 | P/4 | singleΔCQI (4 layers) |

The ΔCQI based on the Table 6 is extremely conservative, even more conservative than the situation of the Table 5. The base station has to do power scaling to compensate the overestimation of interference power compared with actual DL transmission. Such method would rely on power scaling at the base station side, which is much less accurate than the UE side processing. More importantly, sometimes the MU CQI is so conservative that it is below the lowest MU CQI value, which means the dynamic range of MU SINR can be minus infinity. In this case, it is not possible to correctly scale the power back at the base station side.

Figure 19:
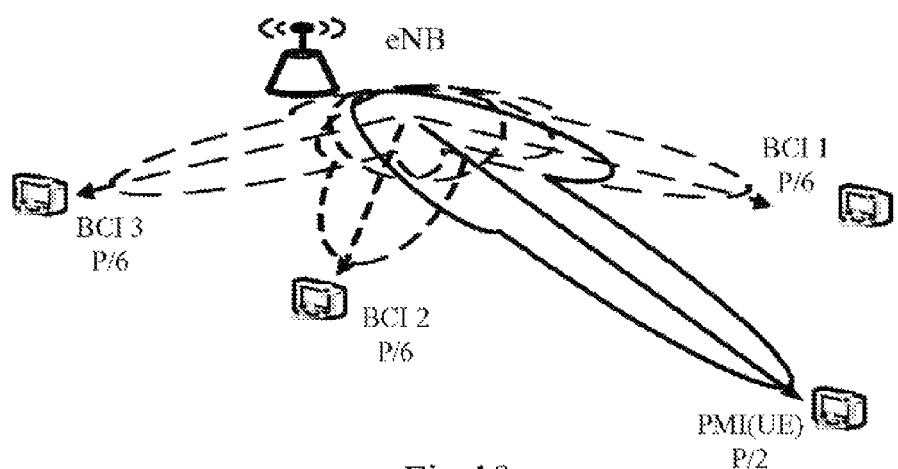
FIG. 19 shows another example of calculating $\Delta CQI$ with respect to the multiple BCIs.

FIG. 19 shows another example of calculating ΔCQI with respect to the multiple BCIs. To improve the above methods, the present embodiment proposes to calculate ΔCQI also assuming the simultaneous existence of the multiple spatial interferences. That is, the UE may assume there are multiple signals transmitted with those BCIs simultaneously. However, in this proposal, a particular power constraint is put on those interferences. That is, the assumed power assignment should approximate the expected actual DL (downlink) transmission power assignment at the base station side. Moreover, if the expected actual DL transmission at the base station is two layers, the power can be equally split between the PMI and the sum of interferences (BCIs). Thus, the PMI power would be P/2, and the sum interference (BCIs) power would be P/2. In addition, if the base station does not have any preference to the BCIs, it is reasonable to further equally split the sum interference power among the BCIs. In case of three BCIs, the power associated with each BCI would be P/6. The corresponding power allocation is illustrated in the FIG. 19 and the Table 7.

TABLE 7

| PMI | BCI1 | BCI2 | BCI3 | ΔCQI |
| --- | --- | --- | --- | --- |
| P/2 | P/6 | P/6 | P/6 | Single ΔCQI (4 layers) |

Such power splitting can be predefined in the specification. It can also be signaled from the base station to the UE, or possibly from UE to the base station by an explicit higher layer or dynamic signaling. Such a method is testable, not conservative, and does not need power scaling at the base station side.

Moreover, the power splitting between BCIs can be equal or unequal. For example, if the base station does not have any preference to a particular BCI, then equal power splitting between BCIs can be considered. In case of three BCIs, the power per BCI would be P/6 as described above.

However, if the base station has a particular preference to use a specific pre-coding vector to pair with the UE, such preference may be signaled to the UE by either a higher layer or dynamic signaling. If the specific pre-coding vector is selected for a BCI, it is possible to allocate more power to that BCI. The UE may also assume that the base station has some preference to a certain pre-coding vector, and allocates more power to a certain BCI, but similarly such preference or power allocation among the BCIs should be signaled to the base station to ensure testability. Example of unequal power allocation between the BCIs is shown in the following Table 8.

TABLE 8

| PMI | BCI1 | BCI2 | BCI3 | ΔCQI |
|-----|------|------|------|------|
| P/2 | P/4 | P/8 | P/8 | Single ΔCQI (4 layers) |

As shown in the Table 8, the base station has preference to use a specific pre-coding vector of BCI1 to pair with the UE, so it allocates more power such as P/4 to the BCI1, and allocates less power such as P/8 to each of BCI2 and BCI3.

With the present embodiment in which the ΔCQI may be calculated based on the assumption that the power splitting between the PMI and the sum of interferences (BCIs) power should approximate the expected actual transmission power at the base station side, a multiple DL transmission hypothesis can be included in one testable ΔCQI reporting, which does not overestimate DL inter-UE-interference and potentially not need additional processing at the base station.

The Ninth Embodiment

Figure 20:
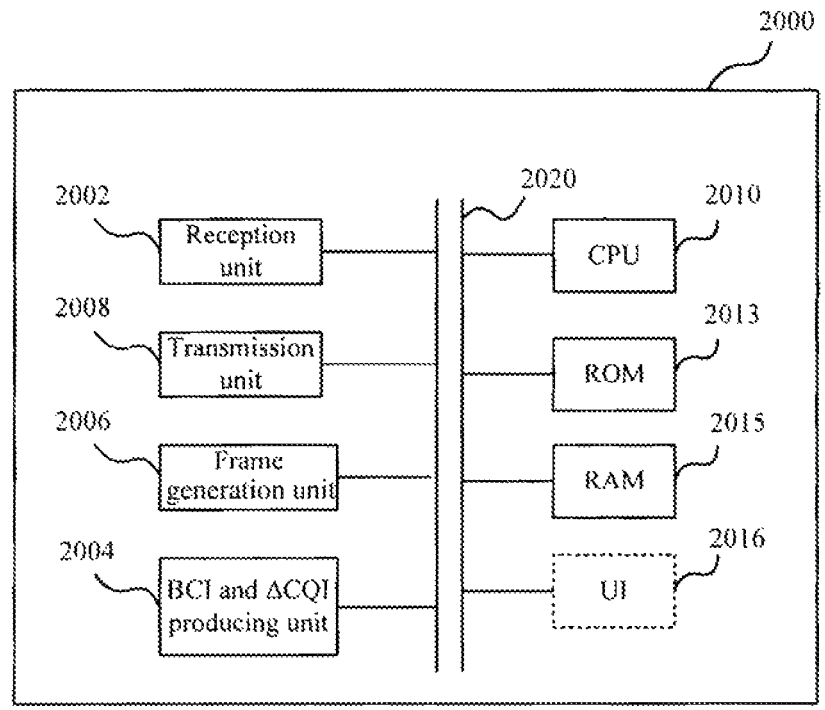
FIG. 20 is a diagram showing the block of the wireless communication terminal according to the eighth embodiment of the disclosure.

FIG. 20 is a diagram showing the block of a wireless communication terminal according to the eighth embodiment of the disclosure.

The wireless communication terminal 2000 according to the eighth embodiment of the present disclosure is used for communicating with the base station in the MU-MIMO system, as shown in the FIG. 20, the wireless communication terminal 2000 includes a reception unit 2002 for receiving pre-coded data transmitted from the base station, a BCI and ΔCQI producing unit 2004 for measuring the downlink transmission channel from the base station to the mobile terminal 2000 and generating multiple BCIs and the corresponding ΔCQIs in accordance with the measured channel condition, a frame generation unit 2006 for generating the frames for transmitting the multiple BCIs and the corresponding ΔCQIs to the base station wherein the period of the frames for transmitting the multiple BCIs is larger than the period of the frames for transmitting a single BCI, and a transmission unit 2008 for transmitting the generated frames. In the above structure, the structures and functions of the reception unit 2002, the BCI and ΔCQI producing unit 2004 and the transmission unit 2008 are not the content to be focused on by the present disclosure, and can be completely implemented by those skilled in the art according to the prior art, so that the detailed description thereof is omitted here.

Furthermore, the wireless communication terminal 2000 according to the present disclosure may further include a CPU (Central Processing Unit) 2010 for executing related programs to process various data and control operations of respective units in the wireless communication terminal 2000, a ROM (Read Only Memory) 2013 for storing various programs required for performing various process and control by the CPU 2010, a RAM (Random Access Memory) 2015 for storing intermediate data temporarily produced in the procedure of process and control by the CPU 2010, and/or a UI (User Interface) unit 2016 for transmitting and receiving various commands, data and so on to/from the users. The above reception unit 2002, BCI and ΔCQI producing unit 2004, frame generation unit 2006, transmission unit 2008, CPU 2010, ROM 2013, RAM 2015, UI unit 2016 and so on may be interconnected via data and/or command bus 2020, and transfer signals between one another.

Respective units as described above are not limiting the scope of the present disclosure. According to one embodiment of the disclosure, the function of any one of the above reception unit 2002, BCI and ΔCQI producing unit 2004, frame generation unit 2006 and transmission unit 2008 may also be implemented by functional software in combination with the above CPU 2010, ROM 2013, RAM 2015, UI unit 2016 and so on.

In the process of the above frame generation unit 2006, the period of the frames for transmitting the multiple BCIs may be set to multiple of the period of the frames for transmitting a single BCI, T.

In the process of the above frame generation unit 2006, the period of the frames for transmitting the first BCI of the multiple BCIs and the period of the frames for transmitting the second BCI of the multiple BCIs may both be set to 2T.

In the process of the above frame generation unit 2006, the period between the frames for transmitting the second BCI and the frames for transmitting the first BCI may be set to T.

In the process of the above frame generation unit 2006, the period between the frames for transmitting the second BCI and the frames for transmitting the first BCI may be set to 0.

In the process of the above frame generation unit 2006, the first ΔCQI may be transmitted within the frames for transmitting the first BCI, and the second ΔCQI may be transmitted within the frames for transmitting the second BCI.

In the process of the above frame generation unit 2006, the first ΔCQI may be transmitted within the frames for transmitting the first BCI, and the second ΔCQI may be transmitted within the frames for transmitting the second BCI. Also, the frames for transmitting the first ΔCQI and the second ΔCQI are added between the frames for transmitting the first BCI.

In the process of the above frame generation unit 2006, the frames for transmitting the first BCI or the frames for transmitting the second BCI may be used to transmit only the ΔCQI with lower value of the first ΔCQI and second ΔCQI, and the frames for transmitting the ΔCQI with lower value are added between the frames for transmitting the first BCI.

In the process of the above frame generation unit 2006, a specific BCI indicator may be assigned to the added frames for transmitting the ΔCQI with lower value to indicate an aged BCI.

In the process of the above frame generation unit 2006, the specific BCI indicator may be written to the position of the significant bit of bits representing the value of ΔCQI with lower value.

The way of reporting the multiple BCIs in the wireless communication terminal of the present embodiment can greatly increase scheduling flexibility at the base station side and thus improve MU-MIMO performance without increasing feedback overhead of channels.

The Tenth Embodiment

Figure 21:
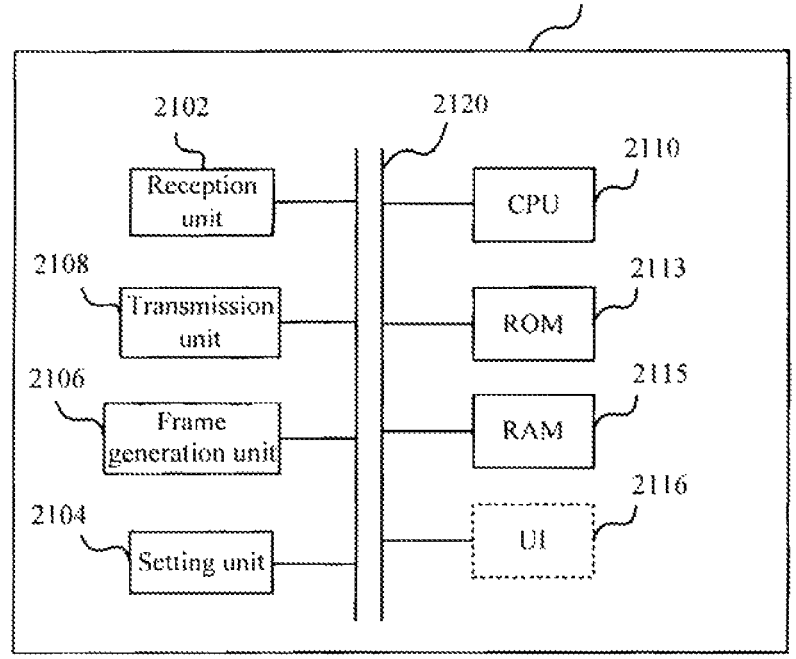
FIG. 21 is a diagram showing the block of the wireless communication terminal according to the ninth embodiment of the disclosure.

FIG. 21 is a diagram showing the block of a wireless communication terminal according to the ninth embodiment of the disclosure.

The wireless communication terminal 2100 according to the ninth embodiment of the present disclosure is used for communicating with the base station in a MU-MIMO system, as shown in the FIG. 21, the wireless communication terminal 2100 includes a reception unit 2102 for receiving a pre-coded data transmitted from the base station, a setting unit 2104 for setting BCI to be a constant value, a frame generation unit 2106 for generating the frames for transmitting ΔCQI to the base station, and a transmission unit 2108 for transmitting the frames containing only ΔCQI to the base station at a predetermined cycle.

Furthermore, the wireless communication terminal 2100 according to the present disclosure may further include a CPU (Central Processing Unit) 2110 for executing related programs to process various data and control operations of respective units in the wireless communication terminal 2100, a ROM (Read Only Memory) 2113 for storing various programs required for performing various process and control by the CPU 2110, a RAM (Random Access Memory) 2115 for storing intermediate data temporarily produced in the procedure of process and control by the CPU 2110, and/or a UI (User Interface) unit 2116 for transmitting and receiving various commands, data and so on to/from the users. The above reception unit 2102, setting unit 2104, frame generation unit 2106, transmission unit 2108, CPU 2110, ROM 2113, RAM 2115, UI unit 2116 and so on may be interconnected via data and/or command bus 2120 and transfer signals between one another.

Respective units as described above are not limiting the scope of the present disclosure. According to one embodiment of the disclosure, the function of any one of the above reception unit 2102, setting unit 2104, frame generation unit 2106 and transmission unit 2108 may also be implemented by functional software in combination with the above CPU 2110, ROM 2113, RAM 2115, UI unit 2116 and so on.

Respective units in the wireless communication terminal 2100 according to the ninth embodiment of the disclosure can further be configured as follows: the frame generation unit 2106 for generating the frames for transmitting BCI and/or the corresponding ΔCQI to the base station; the setting unit 2104 for setting a threshold for the ΔCQI; and the transmission unit 2108 for transmitting the frames at a predetermined cycle, wherein the frames contain both the BCI and the corresponding ΔCQI when the value of the ΔCQI is less than or equals to the threshold, whereas the frames contain only the ΔCQI when the value of the ΔCQI is more than the threshold. The above BCI and corresponding ΔCQI can be plural BCIs and corresponding ΔCQIs.

According to another embodiment of the present disclosure, the above mobile (wireless communication) terminal 2000 or 2100 for communicating with the base station in the multiple user-multiple input and multiple output system can also be realized as comprises a frame-generation unit which generates the frames for transmitting a PMI, plural BCIs, and a ΔCQI to the base station, and a calculation unit which calculates the ΔCQI by making power assignment approximate the actual downlink transmission power assignment at the base station, wherein, the PMI represents pre-coding matrix preferred to be used for the mobile terminal, the BCI represents best companion pre-coding matrix preferred to be used for other mobile terminals possibly paired with the mobile terminal, and ΔCQI represents a channel quality degradation due to use of the plural BCIs. In the above mobile terminal, the ΔCQI can be calculated by equally allocating the power between the PMI and the sum of the plural BCIs. Further, the power allocated to the plural BCIs can be equally or unequally allocated among the plural BCIs.

The way of reporting the multiple BCIs in the wireless communication terminal of the present embodiment can greatly increase scheduling flexibility at the base station side and thus improve MU-MIMO performance without increasing feedback overhead of channels.

The Eleventh Embodiment

Figure 22:
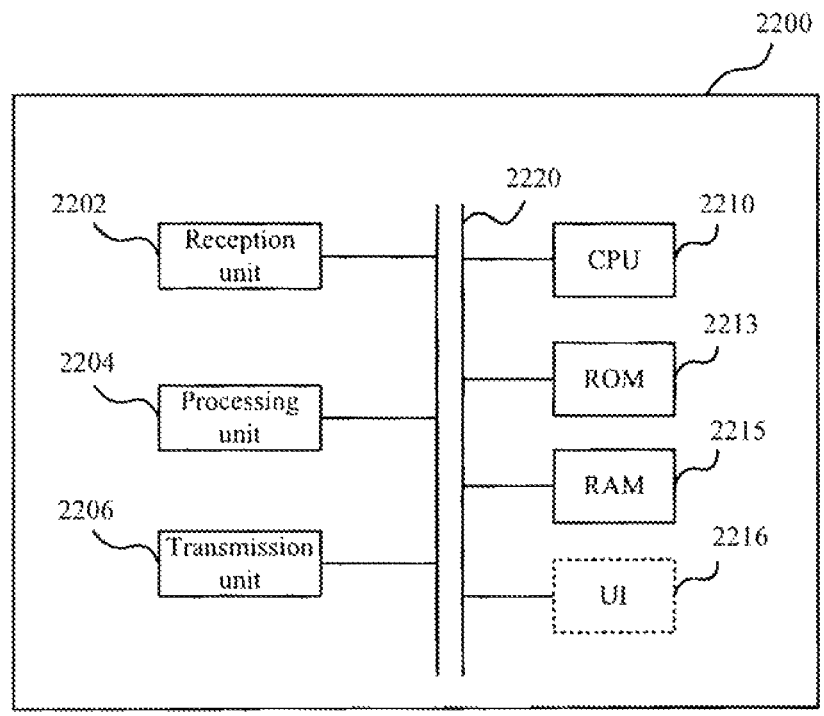
FIG. 22 is a diagram showing the block of the base station according to the tenth embodiment of the disclosure.

FIG. 22 is a diagram showing the block of the base station according to the tenth embodiment of the present disclosure.

The base station 2200 according to the tenth embodiment of the present disclosure is used for communicating with wireless communication terminals in the MU-MIMO system, as shown in the FIG. 22, the base station 2200 includes a reception unit 2202 for receiving the frames containing the multiple BCIs and corresponding ΔCQIs as well as various data frames transmitted from the wireless communication terminals, wherein the period of the frames containing the multiple BCIs is larger than the period of the frames for a single BCI, a processing unit 2204 for pre-coding data to be transmitted to the corresponding wireless communication terminals in accordance with the received multiple BCIs and ΔCQIs, and a transmission unit 2206 for transmitting pre-coded data to the wireless communication terminals.

The base station 2200 according to the present disclosure may further include a CPU (Central Processing Unit) 2210 for executing related programs to process various data and control operations of respective units in the base station 2200, a ROM (Read Only Memory) 2213 for storing various programs required for performing various process and control by the CPU 2210, a RAM (Random Access Memory) 2215 for storing intermediate data temporarily produced in the procedure of process and control by the CPU 2210, and/or a UI (User Interface) unit 2216 for transmitting and receiving various commands, data and so on to/from the users. The above reception unit 2202, processing unit 2204, transmission unit 2206, CPU 2210, ROM 2213, RAM 2215 and/or UI unit 2216 etc. may be interconnected via data and/or command bus 2220 and transfer signals between one another.

Respective units as described above are not limiting the scope of the present disclosure. According to one embodiment of the disclosure, the function of any one of the above reception unit 2202, processing unit 2204 and transmission unit 2206 may also be implemented by functional software in combination with the above CPU 2210, ROM 2213, RAM 2215 and/or UI unit 2216 etc.

In the received frames containing the multiple BCIs and the corresponding ΔCQIs transmitted from the wireless communication terminal, the period of the frames for carrying the multiple BCIs may be set to multiple of the period of the frames for carrying a single BCI, T.

In the received frames containing the multiple BCIs and the corresponding ΔCQIs transmitted from the wireless communication terminal, the period of the frames for carrying the first BCI of the multiple BCIs and the period of the frames for carrying the second BCI of the multiple BCIs may both be set to 2T.

In the received frames containing the multiple BCIs and the corresponding ΔCQIs transmitted from the wireless communication terminal, the period between the frames for carrying the second BCI and the frames for carrying the first BCI may be set to T.

In the received frames containing the multiple BCIs and the corresponding ΔCQIs transmitted from the wireless communication terminal, the period between the frames for carrying the second BCI and the frames for carrying the first BCI may be set to 0.

In the received frames containing the multiple BCIs and the corresponding ΔCQIs transmitted from the wireless communication terminal, the first ΔCQI may be carried within the frames for carrying the first BCI, and the second ΔCQI may be carried within the frames for carrying the second BCI.

In the received frames containing the multiple BCIs and the corresponding ΔCQIs transmitted from the wireless communication terminal, the first ΔCQI may be carried within the frames for carrying the first BCI, the second ΔCQI may be carried within the frames for carrying the second BCI, and the frames for carrying the first ΔCQI and second ΔCQI may be added between the frames for carrying the first BCI.

In the received frames containing the multiple BCIs and the corresponding ΔCQIs transmitted from the wireless communication terminal, the frames for carrying the first BCI or the frames for carrying the second BCI may be used to carry only the ΔCQI with lower value of the first ΔCQI and second ΔCQI, and the frames for carrying the ΔCQI with lower value may be added between the frames for carrying the first BCI.

In the received frames containing the multiple BCIs and the corresponding ΔCQIs transmitted from the wireless communication terminal, a specific BCI indicator may be assigned to the added frames for carrying the ΔCQI with lower value to indicate an aged BCI.

In the received frames containing the multiple BCIs and the corresponding ΔCQIs transmitted from the wireless communication terminal, the specific BCI indicator may be written to the position of the significant bit of bits representing the value of ΔCQI with lower value.

The way of receiving frames for reporting the multiple BCIs in the base station of the present embodiment can greatly increase scheduling flexibility at base station side and thus improve MU-MIMO performance without increasing feedback overhead of channels.

The Twelfth Embodiment

Figure 23:
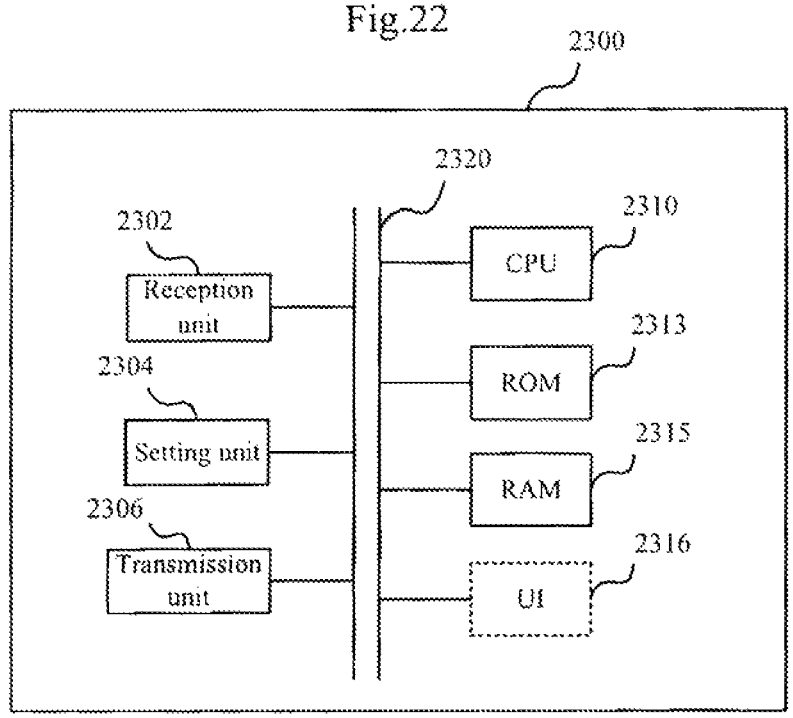
FIG. 23 is a diagram showing the block of the base station according to the eleventh embodiment of the disclosure.

FIG. 23 is a diagram showing the block of the base station according to the eleventh embodiment of the disclosure.

The base station 2300 according to the eleventh embodiment of the present disclosure is used for communicating with wireless communication terminals in the MU-MIMO system, as shown in the FIG. 23, the base station 2300 includes a setting unit 2304 for setting BCI to be a constant value, a reception unit 2302 for receiving the frames containing only ΔCQI from the wireless communication terminals, and a transmission unit 2306 for transmitting the pre-coded data to the wireless communication terminals.

The base station 2300 according to the present disclosure may further include a CPU (Central Processing Unit) 2310 for executing related programs to process various data and control operations of respective units in the base station 2300, a ROM (Read Only Memory) 2313 for storing various programs required for performing various process and control by the CPU 2310, a RAM (Random Access Memory) 2315 for storing intermediate data temporarily produced in the procedure of process and control by the CPU 2310, and/or a UI (User Interface) unit 2316 for transmitting and receiving various commands, data and so on to/from the users. The above reception unit 2302, setting unit 2304, transmission unit 2306, CPU 2310, ROM 2313, RAM 2315 and/or UI unit 2316 etc. may be interconnected via data and/or command bus 2320 and transfer signals between one another.

Respective units as described above are not limiting the scope of the present disclosure. According to one embodiment of the disclosure, the function of any one of the above reception unit 2302, setting unit 2304 and transmission unit 2306 may also be implemented by functional software in combination with the above CPU 2310, ROM 2313, RAM 2315 and/or UI unit 2316 etc.

In the above base station according to the present embodiment, each frame may contain multiple ΔCQIs, and the period of the frames for carrying the multiple ΔCQIs is larger than the period of the frames for carrying a single ΔCQI.

Respective units in the base station 2300 according to the eleventh embodiment of the disclosure can further be configured as follows: the reception unit 2302 for receiving the frames containing BCI and/or the corresponding ΔCQI from the wireless communication terminals, wherein the received frames contain both the BCI and the corresponding ΔCQI when the value of the ΔCQI is less than or equals to the set threshold, whereas the received frames contain only the ΔCQI when the value of the ΔCQI is more than the threshold. In the above base station 2300, the number of the BCIs and ΔCQIs in each frame may be multiple.

According to another embodiment of the present disclosure, the above base station for communicating with plural mobile terminals in the multiple user-multiple input and multiple output system can be realized as comprises: a receiving unit which receives the frames containing a PMI, plural BCIs, and a ΔCQI from mobile terminal, wherein the ΔCQI being calculated by making power assignment approximate the actual downlink transmission power assignment at the base station; and a processing unit which performs pre-coding operation with respect to the plural mobile terminals in consideration of the PMI, the plural BCIs, and the ΔCQI, wherein, the PMI representing pre-coding matrix preferred to be used for the mobile terminal, the BCI representing best companion pre-coding matrix preferred to be used for other mobile terminals possibly paired with the mobile terminal, and ΔCQI representing a channel quality degradation due to use of the plural BCIs. In the above base station, the ΔCQI can be calculated by equally allocating the power between the PMI and the sum of the plural BCIs. Further, the power allocated to the plural BCIs can be equally or unequally allocated among the plural BCIs.

The way of reporting BCI in the base station of the present embodiment can greatly increase scheduling flexibility at base station side, and thus improve MU-MIMO performance without increasing feedback overhead of channels.

It should be noted that the description has been made with respect to the case of transmitting BCI and the corresponding ΔCQI in time domain in respective embodiments above, however, the present disclosure is not limited to transmitting BCI and the corresponding ΔCQI in time domain, and can additionally be applied to the case of transmitting BCI and the corresponding ΔCQI in frequency domain. For example, one or multiple BCI(s) and corresponding CQI(s) may be transmitted over different carriers in frequency domain. According to respective embodiments of the present disclosure above, the same processing as in time domain can be made to the one or multiple BCI(s) and the corresponding ΔCQI(s) transmitted over different carriers in frequency domain.

Moreover, as described in respective embodiments above, the number of BCIs and the corresponding ΔCQIs may not be limited to two or three, and may be multiple, and specific number of transmission may be specifically set in accordance with specific requirements of the communication system.

Respective embodiments of the present application above are only for exemplary description, and specific structures and operations thereof are not limiting the scope of the present disclosure. Those skilled in the art may recombine various parts and operations in respective embodiments as described above to create new embodiments, which also accords with the present disclosure.

Embodiments of the present disclosure may be implemented by hardware, software and firmware or in a combination thereof, and the way of implementation is not limiting the scope of the present disclosure.

The connection relationships between respective functional elements (units) in the respective embodiments of the disclosure are not limiting the scope of the present disclosure, in which one or more functional element(s) may contain or be connected to any other functional elements.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of those skilled in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

With respect to the use of substantially any plural and/or singular terms herein, those having skills in the art can translate from the plural to the singular and/or from the singular to the plural as is appropriate to the context and/or application. The various singular/plural permutations may be expressly set forth herein for sake of clarity.

It will be understood by those skilled in the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Although several embodiments of the present disclosure has been shown and described in combination with attached drawings above, it should be understood by those skilled in the art that various variations and modifications which still fall into the scope of claims and their equivalents of the present disclosure can be made to these embodiments without departing from the spirit and principle of the disclosure.

The invention claimed is:

1. A wireless communication method for a MU-MIMO system including a base station and a terminal communicating with the base station, the method comprising:
   transmitting a plurality of best companion pre-coding matrix indexes (BCIs) and corresponding delta channel quality indicators ($\Delta$CQIs) from said terminal to said base station,
   wherein the period of frames for transmitting the plurality of BCIs is larger than the period of frames for transmitting a single BCI.

2. The wireless communication method according to claim 1, wherein the period of frames for transmitting the plurality of BCIs is multiple of the period of frames for transmitting the single BCI, T.

3. The wireless communication method according to claim 2, wherein the period of frames for transmitting a first BCI of the plurality of BCIs and the period of frames for transmitting a second BCI of the plurality of BCIs both are 2T.

4. The wireless communication method according to claim 3, wherein the period between the frames for transmitting the first BCI and the frames for transmitting the second BCI is T.

5. The wireless communication method according to claim 4, wherein a first $\Delta$CQI is transmitted within the frames for transmitting the first BCI, and a second $\Delta$CQI is transmitted within the frames for transmitting the second BCI.

6. The wireless communication method according to claim 3, wherein the period between the frames for transmitting the first BCI and the frames for transmitting the second BCI is zero.

7. The wireless communication method according to claim 6, wherein a first ΔCQI is transmitted within the frames for transmitting the first BCI, a second ΔCQI is transmitted within the frames for transmitting the second BCI, and more frames for transmitting the first ΔCQI and second ΔCQI are added between the frames for transmitting the first BCI.

8. The wireless communication method according to claim 6, wherein the frames for transmitting the first BCI or the frames for transmitting the second BCI are used to transmit only the ΔCQI with lower value of the first ΔCQI and second ΔCQI, and more frames for transmitting the ΔCQI with lower value are added between the frames for transmitting the first BCI.

9. The wireless communication method according to claim 8, wherein a specific BCI indicator is assigned to the added frames for transmitting the ΔCQI with lower value to indicate an aged BCI.

10. The wireless communication method according to claim 9, wherein the specific BCI indicator is written to a position of the significant bit of bits representing the value of ΔCQI with lower value.

11. The wireless communication method according to claim 6, wherein a first ΔCQI is transmitted within the frames for transmitting the first BCI, and a second ΔCQI is transmitted within the frames for transmitting the second BCI.

12. A wireless communication terminal for communicating with a base station in a MU-MIMO system, the wireless communication terminal comprising:
a frame generating unit for generating frames for transmitting a plurality of best companion pre-coding matrix indexs (BCIs) and corresponding delta channel quality indicators (ΔCQIs) to said base station,
wherein the period of frames for transmitting the plurality of BCIs is larger than the period of frames for transmitting a single BCI.

13. The wireless communication terminal according to claim 12, wherein the period of frames for transmitting the plurality of BCIs is multiple of the period of frames for transmitting the single BCI, T.

14. The wireless communication terminal according to claim 13, wherein the period of frames for transmitting a first BCI of the plurality of BCIs and the period of frames for transmitting a second BCI of the plurality of BCIs both are 2T.

15. The wireless communication terminal according to claim 14, wherein the period between the frames for transmitting the first BCI and the frames for transmitting the second BCI is T.

16. The wireless communication terminal according to claim 15, wherein a first ΔCQI is transmitted within the frames for transmitting the first BCI, and a second ΔCQI is transmitted within the frames for transmitting the second BCI.

17. The wireless communication terminal according to claim 14, wherein the period between the frames for transmitting the first BCI and the frames for transmitting the second BCI is zero.

18. The wireless communication terminal according to claim 17, wherein a first ΔCQI is transmitted within the frames for transmitting the first BCI, a second ΔCQI is transmitted within the frames for transmitting the second BCI, and more frames for transmitting the first ΔCQI and second ΔCQI are added between the frames for transmitting the first BCI.

19. The wireless communication terminal according to claim 17, wherein the frames for transmitting the first BCI or the frames for transmitting the second BCI are used to transmit only the ΔCQI with lower value of the first ΔCQI and second ΔCQI, and more frames for transmitting the ΔCQI with lower value are added between the frames for transmitting the first BCI.

20. The wireless communication terminal according to claim 19, wherein a specific BCI indicator is assigned to the added frames for transmitting the ΔCQI with lower value to indicate an aged BCI.

21. The wireless communication terminal according to claim 20, wherein the specific BCI indicator is written to a position of the significant bit of bits representing the value of ΔCQI with lower value.

22. The wireless communication terminal according to claim 17, wherein a first ΔCQI is transmitted within the frames for transmitting the first BCI, and a second ΔCQI is transmitted within the frames for transmitting the second BCI.

23. A base station for communicating with wireless communication terminals in a MU-MIMO system, the base station comprising:
a reception unit for receiving a plurality of best companion pre-coding matrix indexs (BCIs) and corresponding delta channel quality indicators (ΔCQIs) from the wireless communication terminal,
wherein the period of frames for carrying the plurality of BCIs is larger than the period of frames for carrying a single BCI.

24. The base station according to claim 23, wherein the period of frames for carrying the plurality of BCIs is multiple of the period of frames for carrying the single BCI, T.

25. The base station according to claim 24, wherein the period of frames for carrying a first BCI of the plurality of BCIs and the period of frames for carrying a second BCI of the plurality of BCIs both are 2T.

26. The base station according to claim 25, wherein the period between the frames for carrying the first BCI and the frames for carrying the second BCI is T.

27. The base station according to claim 26, wherein a first ΔCQI is carried within the frames for carrying the first BCI, and a second ΔCQI is carried within the frames for carrying the second BCI.

28. The base station according to claim 25, wherein the period between the frames for carrying the first BCI and the frames for carrying the second BCI is zero.

29. The base station according to claim 28, wherein a first ΔCQI is carried within the frames for carrying the first BCI, a second ΔCQI is carried within the frames for carrying the second BCI, and more frames for carrying the first ΔCQI and second ΔCQI are added between the frames for carrying the first BCI.

30. The base station according to claim 28, wherein the frames for carrying the first BCI or the frames for carrying the second BCI are used to carry only the ΔCQI with lower value of the first ΔCQI and second ΔCQI, and more frames for carrying the ΔCQI with lower value are added between the frames for carrying the first BCI.

31. The base station according to claim 30, wherein a specific BCI indicator is assigned to the added frames for carrying the ΔCQI with lower value to indicate an aged BCI.

32. The base station according to claim 31, wherein the specific BCI indicator is written to a position of the significant bit of bits representing the value of ΔCQI with lower value.

33. The base station according to claim 28, wherein a first ΔCQI is carried within the frames for carrying the first BCI, and a second ΔCQI is carried within the frames for carrying the second BCI.

* * * * *